(12) United States Patent
Steinmetz et al.

(10) Patent No.: US 6,464,763 B1
(45) Date of Patent: Oct. 15, 2002

(54) WATER SOLUBLE COMPOSITION AS METAL SURFACE COATING IN THE FORM OF DRY FILMS PROOF TO ATMOSPHERIC CORROSION

(75) Inventors: Pierre Steinmetz, Vandoeuvre; Jacques Cotteret, Millery; Corinne Chauvineau, Paris, all of (FR)

(73) Assignee: Elf Antar France, Courbevoie (FR)

( * ) Notice: Subject to any disclaimer, the term of this patent is extended or adjusted under 35 U.S.C. 154(b) by 0 days.

(21) Appl. No.: 09/674,675

(22) PCT Filed: May 4, 1999

(86) PCT No.: PCT/FR99/01050

§ 371 (c)(1),
(2), (4) Date: May 22, 2001

(87) PCT Pub. No.: WO99/57206

PCT Pub. Date: Nov. 11, 1999

(30) Foreign Application Priority Data

May 4, 1998 (FR) ............................................. 98 05624

(51) Int. Cl.[7] ................................................. C09D 5/00
(52) U.S. Cl. ............................... 106/14.42; 106/14.13; 106/14.16; 106/14.18; 106/14.41; 252/392; 252/394; 252/396; 427/378; 427/384; 427/388.4
(58) Field of Search ........................... 106/14.42, 14.13, 106/14.16, 14.18, 14.41; 252/392, 394, 396; 427/378, 384, 388.4

(56) References Cited

U.S. PATENT DOCUMENTS 4,073,618 A * 2/1978 Doi et al. ................. 106/14.14
5,814,247 A * 9/1998 Derule et al. ............ 106/14.05

FOREIGN PATENT DOCUMENTS

WO 96/35767 * 11/1996

* cited by examiner

Primary Examiner—Anthony J. Green
(74) Attorney, Agent, or Firm—Mitchell S. Feller; Clifford Chance Rogers & Wells LLP

(57) ABSTRACT

A composition for use in forming a dry film coating on metal surfaces to at least temporarily protect the surfaces from oxidation comprises at least 20% by weight of a combination of at least one saturated linear carboxylic monoacid with at least one unsaturated linear carboxylic monoacid. The monoacids are in the form of alkaline, alkaline-earth or amine salts. The carbon chain of each acid comprises an uneven number of carbon atoms varying from 5 to 21. At least 0.5% by weight of a triazole derivative can be added to enhance the anti-corrosion effect. The composition is water-soluble and the dry protective film can be formed by diluting the composition in water, applying the diluted composition to a metal surface and then air drying it.

27 Claims, No Drawings

WATER SOLUBLE COMPOSITION AS METAL SURFACE COATING IN THE FORM OF DRY FILMS PROOF TO ATMOSPHERIC CORROSION

The present invention relates to a water-soluble composition for providing a temporary coating, in the form of a dry film, on metal surfaces of various forms, which are subject to atmospheric oxidation. It also relates to the method for applying the composition to these surfaces and to its use for protecting various specific metal surfaces.

After metal plates or tubes have been shaped, it is frequently necessary to store them for many months under shelter before using them. Such storage, which is always possible, is a source of concern to producers as, in the absence of protection against air and humidity oxidation, a layer of oxidation forms at the surface, or the surface is subject to pitting or other phenomena corresponding to a progressive deterioration of the surface state of these materials. Any alteration or deterioration of their surface can however have a considerable impact on their implementation or on the long-term effectiveness of subsequent treatments to which they may be subjected. This involves decreasing the risk of breakage or cracking during shaping or deep drawing of these materials or, yet again, flaking or cracking of coatings applied to them.

To avoid these disadvantages associated with atmospheric oxidation, it is necessary to keep these metal surfaces, plates or tubes away from the air, and several techniques aimed at this have already been employed.

Thus, various types of temporary coatings, impermeable to air, have been developed. Apart from their temporary character, such coatings should be easy to apply, and should also be readily eliminated without this leading to supplementary pollution, modification of the underlying surface state, or difficulties during their handling.

A first type of coating habitually employed consists of oily or semi-oily: compositions obtained by mixing water and mineral oil into an emulsion, in the presence of a corrosion inhibitor as disclosed in U.S. Pat. No. 4,342,596.

Another type of oily coating comprises an emulsified mixture in water of paraffins and partially esterified paraffins, of a small proportion of amides resulting from the reaction of an amine on a long chain carboxylic acid, or a mixture of alcohol, hydrocarbons and surfactant as disclosed in U.S. Pat. No. 4,479,981.

Such coatings are presented as having good stability and forming an excellent barrier against atmospheric oxidation. Additionally, they perform a lubricating function during subsequent treatment of the materials thus protected. Nevertheless, for simple storage, the oily character of these coatings is a source of inconvenience and not inconsiderable pollution.

Other temporary protection coatings are obtained by spreading water soluble compositions on the surface to be protected from atmospheric air, such water soluble compositions being obtained by mixing polyoxyalkyleneglycols and alkyl derivatives of succinic anhydride such as the composition disclosed in U.S. Pat. No. 5,316,696. These coatings, although they are not oily, constitute liquid protective films at the surface of the metallic materials.

Additionally, in European patent application 0,566,087 it is stated that certain combinations of mono- and dicarboxylic acids can be employed as atmospheric corrosion inhibitors in the form of coatings on materials to be protected, the nature of the coating not being defined.

The present invention aims at providing a coating for protecting metal surfaces from atmospheric corrosion, taking the form of a non-oily dry film allowing easier handling of these surfaces while simultaneously limiting the risk of polluting the premises where they are stored or of dirtying the hands of people handling them. It also sets out to provide a dry film which is readily eliminated by washing with water and drying, or which can remain on the metal surface beneath a subsequently applied coating, paint layer or other surface coating. For certain paints and certain varnishes, the presence of the dry film improves adhesion of subsequent layers.

The present invention consequently provides a water-soluble composition as a temporary coating, in the form of a dry film, for metal surfaces subject to atmospheric oxidation, containing at least one carboxylic acid, characterised in that it comprises at least 20% by weight of a combination of at least one saturated linear carboxylic monoacid with at least one unsaturated linear carboxylic monoacid, in the form of alkaline, alkaline-earth or amine salts, the carbon chain of each acid comprising an uneven number of carbon atoms varying from 5 to 21 and, optionally, at least 0.5% by weight of a triazole derivative.

The combination of two uneven-numbered carbon chain carboxylic monoacids, one being saturated and the other unsaturated brings about, in a dry film, a completely unexpected improvement in the effectiveness of protection, notably against the formation of corrosion on the metal surfaces. The atmospheric anti-corrosion effect of this synergy is enhanced, for zinc-coated steel, by the addition of a triazole compound.

More precisely, this composition according to the invention comprises from 25 to 40% by weight of said combination, from 0.5 to 5% by weight of at least one triazole derivative, and from 40 to 50% by weight water.

In a preferred embodiment, the combination is constituted by two carboxylic monoacids selected from saturated acids comprising 5 to 15 carbon atoms and from unsaturated acids comprising from 9 to 21 carbon atoms, these two acids having a saturated acid/unsaturated acid molar ratio comprised between 5 and 20.

In particular, the combination is constituted by from 20 to 35% by weight of the composition of at least one half of a saturated acid selected from heptanoic acid and nonanoic acid and from 2 to 5% by composition weight of an undecylenic acid salt.

The triazole derivative according to the invention is selected from the group constituted by benzotriazoles, tolyltriazoles and alkyltriazoles.

To facilitate covering of the metal surface to be protected and to accelerate drying, preferably from 0.005 to 2% by weight of at least one wetting agent is added to the composition. This wetting agent is chosen from the group comprising anionic surfactants such as alkyl sulfates or non-ionic. surfactants such as ethoxylated compounds of the fatty alcohol or alkylphenol type.

The invention also provides a method for depositing and forming a temporary protective film from said concentrated composition, consisting in:

diluting said composition to between 1 and 10% by weight in water:

bringing the solution thus formed into contact with the metal surface, draining said, solution and then delivering a stream of air, optionally heated, to said metal surface until it is dry.

In order to bring the solution formed into contact with the metal surface, any means, notably sprinkling, spraying or, yet again, immersion can be employed.

The film thus obtained takes the form of a dry, non-oily, film which is not sticky and which leaves no trace on the hands during handling of plates or bundles of metal tubes, and which protects them from atmospheric corrosion.

To remove the film, simple washing of the metal surfaces with water followed by air drying is sufficient.

The invention thirdly covers the use of these concentrated compositions in the form of a dry film for protecting metallic surfaces in carbon steel, zinc coated or galvanised, and the copper and aluminium alloys.

In the remainder of this description, examples are provided by way of illustration which however are not limiting.

EXAMPLE 1

This present example sets out to demonstrate the anti-corrosive effect of dry films obtained by combining two carboxylic acids according to the invention, for protecting metal surfaces.

10 compositions, C1, C2, C3, C4, C5, X1, X2, X3, X4, and X5 were prepared, the compositions Xi corresponding to compositions according to the invention. Their composition is given in Table I below (in percent by weight):

TABLE I

| Components | C1 | C2 | C3 | C4 | C5 | X1 | X2 | X3 | X4 | X5 |
|---|---|---|---|---|---|---|---|---|---|---|
| Heptanoic acid | 10 | 0 | 20 | 0 | 0 | 18 | 10 | 20 | 25 | 35 |
| Nonanoic acid | 5 | 5 | 0 | 20 | 0 | 7 | 5 | 0 | 0 | 0 |
| Undecylenic acid | 0 | 5 | 0 | 0 | 10 | 4 | 10 | 2 | 4 | 5 |
| Benzotriazole | 0 | 0 | 0 | 0 | 0 | 0 | 0.5 | 0 | 0 | 0 |
| Tolyltriazole | 0 | 0 | 0 | 0 | 0 | 1 | 0 | 0 | 2.5 | 3 |

For carrying out tests on the metallic surfaces, the solutions C1 to C5 and X1 to X5 were employed at a 3% dilution in membrane-purified water.

Two types of test were performed to verify protection, one under moist conditions and the other under dry conditions.

The test under moist conditions, carried out in the laboratory, consisted in immersing two types of 4 mm square section metal tubes 5 cm long, in "DKP" type carbon steel in a crystalliser filled with 200 ml of the solution to be tested, some, J1, not being coated and others, J2, being zinc coated (galvanised), for at least 40 days. Their surface state was examined visually every day, in particular the face of each tube in contact with the bottom of the crystalliser in which it was immersed. The test was stopped when the spots of corrosion (for the uncoated samples) or white blister (for the galvanised samples) appeared at the surface, or after the 40th day. The period of time after which the formation of spots of corrosion or white blister was observed visually for each one of these tests is given in Table II below.

TABLE II

|  | J1 | J2 |
|---|---|---|
| C1 | 12 days | 2 hours |
| C2 | 12 days | 2 hours |
| C3 | 12 days | 2 hours |
| C4 | 8 days | 2 hours |
| C5 | 8 days | 2 hours |
| X1 | nothing after 40 days | 2 days |
| X2 | nothing after 40 days | 2 days |
| X3 | nothing after 40 days | 1 day |
| X4 | nothing after 40 days | 2 days |
| X5 | nothing after 40 days | 2 days |

In the test under dry conditions, metal tubes of the same square section but 10 m long were immersed in these solutions, then drained and finally air dried before being bundled and then stored sheltered from rain and running water. They were opened and the surfaces were examined three months later. The observations are given in Table III below.

TABLE III

|  | J1 | J2 |
|---|---|---|
| X1 | no corrosion | a few spots close to the weld |
| X2 | no corrosion | no corrosion |
| X3 | no corrosion | a few spots of grey-coloured deposit |
| X4 | no corrosion | a few spots close to the weld |
| X5 | no corrosion | no corrosion |

The inhibiting power of these compositions was additionally determined by electrochemical measurements carried out using iron and zinc samples. These tests were carried out in conformity with ASTM G59-91 for determining polarisation resistance (Rp) and ASTM G5-87 and G102-89 for determining corrosion currents ($I_{corr}$) The solutions C1 to C5 and X1 to X5 had been diluted to 10% in water to which sodium sulphate, sodium chloride and sodium hydrogen carbonate had been added in an amount such that, after dilution, the amount of these constituents in the final solution was the amount required by ASTM D1384-87, viz: 148 mg $Na_2SO_4$, 165 mg NaCl and 138 mg $NaHCO_3$.

The values measured for corrosion current fell into two ranges of values, corresponding, respectively, to solutions of type Ci and solutions of type Xi. Table IV gives the extreme values.

TABLE IV

| Solution | type Ci | type Xi |
|---|---|---|
| Rp iron (KΩ.cm$^2$) | 100–500 | 600 to 900 |
| Rp Zn (kΩ.cm$^2$) | 50–300 | 600 to 3000 |
| $I_{corr}$ iron (nA.cm$^{-2}$) | 200 to 2000 | 85 to 150 |
| $I_{corr}$ Zn (nA.cm$^{-2}$) | 200 to 1200 | 19 to 100 |

With solutions of type Xi, the speed of corrosion was substantially lower than with the Ci type solutions, as shown by the reverse evolution of polarisation resistance and corrosion current.

From these results, the superiority of the combination of saturated monocarboxylic acids and unsaturated monocarboxylic acids compared to these same acids alone can be seen, preferably in the form of dry films.

EXAMPLE II

This example sets out to demonstrate the value of the dry films according to the invention as a non-oily preventive coating against atmospheric corrosion even underneath layers of paint, varnish or primer, applied directly to the dry films.

Square section (25 mm×25 mm) "DKP" type steel tubes 3 mm thick and 10 cm long where dipped for 2 minutes into dilute solutions of X1 to X5, and were then air dried for 24 hours.

These tubes, the clean and dry appearance of which was duly noted, were then covered with one or the other of the materials Y1 to Y3, described below.

Y1 was a colorless FA 20 varnish applied by spraying, followed by drying for two hours and then stoving for one hour at 100° C.

Y2 was a brilliant Sedocolor S 160 black lacquer applied by spraying, which was dried for two hours and then stoved for one hour at 100° C.

Y3 was a light grey granite-finish Plastcolor primer that was sprayed on and then dried for 24 hours.

For each coating, the adhesion of the paint, varnish or primer film was observed on tubes previously coated with compositions X1 to X5 according to the invention. This adhesion test consisted in applying a 10 cm long adhesive tape to each tube and removing it after two minutes. Observations of the tube surface made it possible to determine whether or not the covering had been torn off or not. For each of the coverings X1 to X5, and each covering Y1 to Y3, good adhesion of the covering and no tearing off was observed.

For each one of the protective films X1 to X5, followed by each surface covering Y1 to Y3, excellent adhesion of the covering was observed with no tendency for it to be torn off.

What is claimed is:

1. A water-soluble composition for use in forming a dry film coating on metal surfaces subject to atmospheric oxidation, comprising:
   at least 20% by weight of a combination of at least one saturated linear carboxylic monoacid with at least one unsaturated linear carboxylic monoacid, said monoacids being in the form of alkaline, alkaline-earth or amine salts, the carbon chain of each acid comprising an uneven number of carbon atoms varying from 5 to 21; and
   at least 0.5% by weight of a triazole derivative.

2. The composition of claim 1, comprising: from 25 to 40% by weight of said combination, from 0.5 to 5% by weight of at least one triazole derivative, and from 40 to 50% by weight water.

3. The composition of claim 1, wherein said combination comprises one saturated linear carboxylic acid comprising from 5 to 15 carbon atoms and one unsaturated linear carboxylic acid comprising from 9 to 21 carbon atoms, the molar ratio of the saturated acid to the unsaturated acid in the composition being between 5 and 20.

4. The composition of claim 1, wherein said combination comprises:
   from 20 to 35% by composition weight of at least one salt of a saturated acid selected from the group consisting of heptanoic acid and nonanoic acid; and
   from 2 to 5% by composition weight of an undecylenic acid salt.

5. The composition of claim 1, wherein said triazole derivative is selected from the group consisting of benzotriazoles, tolyltriazoles and alkyltriazoles.

6. A water-soluble composition for use in forming a dry film coating on metal surfaces subject to atmospheric oxidation, comprising:
   from 25 to 40% by weight of a combination of (a) one saturated linear carboxylic monoacid comprising from 5 to 15 carbon atoms and (b) one unsaturated linear carboxylic monoacid comprising from 9 to 21 carbon atoms, said monoacids being in the form of alkaline, alkaline-earth or amine salts, the carbon chain of each monoacid comprising an uneven number of carbon atoms, the molar ratio of the saturated acid to the unsaturated acid in the composition being between 5 and 20; and
   from 0.5 to 5% by weight of at least one triazole derivative.

7. The composition of claim 6, wherein said combination comprises:
   from 20 to 35% by composition weight of at least one salt of a saturated acid selected from the group consisting of a heptanoic acid and a nonanoic acid; and
   from 2 to 5% by composition weight of an undecylenic acid salt.

8. The composition of claim 6, wherein said triazole derivative is selected from the group consisting of benzotriazoles, tolyltriazoles and alkyltriazoles.

9. The composition of claim 6, further comprising
   from 0.005 to 2% by composition weight of a wetting agent selected from the group consisting of anionic surfactants and non-ionic surfactants.

10. The composition of claim 9, wherein the anionic surfactants are alkylsulfates and the non-ionic surfactants are at least one of fatty alcohol ethoxylated compounds and alkylphenol ethoxylated compounds.

11. A water-soluble composition for use in forming a dry film coating on metal surfaces subject to atmospheric oxidation, comprising:
   a combination comprising (a) from 20 to 35% by composition weight of at least one salt of a saturated acid selected from the group consisting of heptanoic acid and nonanoic acid and (b) from 2 to 5% by composition weight of an undecylenic acid salt, said salts being alkaline, alkaline-earth or amine salts; and
   at least 0.5% by weight of a triazole derivative selected from the group consisting of benzotriazoles, tolyltriazoles and alkyltriazoles.

12. The composition of claim 11, further comprising
   from 0.005 to 2% by composition weight of a wetting agent selected from the group consisting of anionic surfactants and non-ionic surfactants.

13. The composition of claim 11, comprising
   from 0.5 to 5% of said triazole derivative; and
   from 40 to 50% by weight water.

14. The composition of claim 12, wherein the anionic surfactants are alkylsulfates and the non-ionic surfactants are at least one of fatty alcohol ethoxylated compounds and alkylphenol ethoxylated compounds.

15. A method for depositing and forming a dry film coating on a metal surface comprising the steps of:
   providing a water soluble composition comprising at least 20% by weight of a combination of at least one saturated linear carboxylic monoacid with at least one unsaturated linear carboxylic monoacid, said monoacids being in the form of alkaline, alkaline-earth or amine salts, the carbon chain of each acid comprising an uneven number of carbon atoms varying from 5 to 21;
   diluting said composition to between 1 and 10% by weight in water;
   bringing the diluted composition into contact with the metal surface; and
   draining the diluted composition and then applying a stream of air to said metal surface until the metal surface is dry.

16. The method of claim 15, wherein said water-soluble composition comprises:
   from 25 to 40% by weight of a combination of one saturated linear carboxylic monoacid comprising from 5 to 15 carbon atoms and one unsaturated linear carboxylic monoacid comprising from 9 to 21 carbon atoms, said monoacids being in the form of alkaline, alkaline-earth or amine salts, the carbon chain of each monoacid comprising an uneven number of carbon atoms, and the saturated acid/unsaturated monoacid molar ratio being comprised between 5 and 20; and from 0.5 to 5% by weight of at least one triazole derivative.

17. The method of claim 15, wherein said water-soluble composition comprises a combination comprising from 20 to 35% by composition weight of at least one salt of a saturated acid selected from the group consisting of heptanoic acid and nonanoic acid; and from 2 to 5% by composition weight of an undecylenic acid salt;

said salts being alkaline, alkaline-earth or amine salts.

18. The method of claim 15, wherein the stream of air is heated.

19. The method of claim 17, wherein the water soluble composition further comprises at least 0.5% by weight of a triazole derivative selected from the group consisting of benzotriazoles, tolyltriazoles and alkyltriazoles.

20. The method of claim 19, wherein said water-soluble composition comprises from 0.5 to 5% of said triazole derivative; and from 40 to 50% by weight water.

21. A method for protecting metallic surfaces in carbon steel, zinc coated or galvanised, or in copper or aluminium alloys, comprising the steps of:

providing a water soluble composition comprising at least 20% by weight of a combination of at least one saturated linear carboxylic monoacid with at least one unsaturated linear carboxylic monoacid, said monoacids being in the form of alkaline, alkaline-earth or amine salts, the carbon chain of each acid comprising an uneven number of carbon atoms varying from 5 to 21; and coating said metallic surfaces with the composition, wherein, when the composition dries, it forms a protective dry film coating on the metallic surface.

22. The method of claim 21, wherein said water-soluble composition comprises from 25 to 40% by weight of a combination of one saturated linear carboxylic monoacid comprising from 5 to 15 carbon atoms and one unsaturated linear carboxylic monoacid comprising from 9 to 21 carbon atoms, said monoacids being in the form of alkaline, alkaline-earth or amine salts, the carbon chain of each monoacid comprising an uneven number of carbon atoms, the molar ratio of the saturated acid to the unsaturated acid in the composition being between 5 and 20; and from 0.5 to 5% by weight of at least one triazole derivative.

23. The method of claim 21, wherein said water-soluble composition comprises a combination comprising from 20 to 35% by composition weight of at least one salt of a saturated acid selected from the group consisting of heptanoic acid and nonanoic acid and from 2 to 5% by composition weight of an undecylenic acid salt, said salts being alkaline, alkaline-earth amine salts.

24. The method of claim 23, wherein the water soluble composition further comprises at least 0.5% by weight of a triazole derivative selected from the group consisting of benzotriazoles, tolyltriazoles and alkyltriazoles.

25. A water-soluble composition for use in forming a dry film coating on metal surfaces subject to atmospheric oxidation, comprising:

at least 20% by weight of a combination of at least one saturated linear carboxylic monoacid with at least one unsaturated linear carboxylic monoacid, said monoacids being in the form of alkaline, alkaline-earth or amine salts, the carbon chain of each acid comprising an uneven number of carbon atoms varying from 5 to 21; and from 0.005 to 2% by composition weight of a wetting agent selected from the group consisting of anionic surfactants and non-ionic surfactants.

26. The composition of claim 25, wherein the anionic surfactants are alkylsulfates and the non-ionic surfactants are at least one of fatty alcohol ethoxylated compounds and alkylphenol ethoxylated compounds.

27. The composition of claim 25, further comprising at least 0.5% by weight of a triazole derivative.

* * * * *